March 7, 1967 H. W. LAUB ET AL 3,308,047

MULTIPLE TIER INCLINED MERCURY CELL

Filed Oct. 31, 1962 5 Sheets-Sheet 1

INVENTORS
HENRY WILLIAM LAUB
GEORG MESSNER
RICHARD ERIC LOFTFIELD
ALEXANDER LOUIS BARBATO
BY Hammond & Littell
ATTORNEYS INVENTORS
HENRY WILLIAM LAUB
GEORG MESSNER
RICHARD ERIC LOFTFIELD
ALEXANDER LOUIS BARBATO
BY
Hammond & Littell
ATTORNEYS March 7, 1967 H. W. LAUB ETAL 3,308,047

MULTIPLE TIER INCLINED MERCURY CELL

Filed Oct. 31, 1962 5 Sheets-Sheet 3

INVENTORS
HENRY WILLIAM LAUB
GEORG MESSNER
RICHARD ERIC LOFTFIELD
ALEXANDER LOUIS BARBATO
BY Hammond & Littell
ATTORNEYS

MULTIPLE TIER INCLINED MERCURY CELL

Filed Oct. 31, 1962 5 Sheets-Sheet 4

INVENTORS
HENRY WILLIAM LAUB
GEORG MESSNER
RICHARD ERIC LOFTFIELD
BY ALEXANDER LOUIS BARBATO
ATTORNEYS

MULTIPLE TIER INCLINED MERCURY CELL

INVENTORS
HENRY WILLIAM LAUB
GEORG MESSNER
RICHARD ERIC LOFTFIELD
ALEXANDER LOUIS BARBATO
BY
ATTORNEYS

United States Patent Office 3,308,047
Patented Mar. 7, 1967

3,308,047
MULTIPLE TIER INCLINED MERCURY CELL

Henry William Laub, Pasadena, Tex., Georg Messner, Milan, Italy, Richard Eric Loftfield, Chardon, and Alexander Louis Barbato, Perry, Ohio, assignors, by direct and mesne assignments, to Oronzio de Nora Impianti Elettrochimici, Milan, Italy, a corporation of Italy Filed Oct. 31, 1962, Ser. No. 234,379
14 Claims. (Cl. 204—219)

This invention relates to an improved electrolysis cell of the flowing mercury cathode type.

One of the objects of our invention is to provide a multiple tier, bipolar cell construction which may be made up of a plurality of cells in which the intermediate cell units are of essentially similar construction and the terminal positive cell frames are similar to each other and the terminal negative cell frames are likewise similar to each other, whereby multiple tier bipolar cells of any desired height or number of cell units may be readily built up or assembled from three standard parts, namely, a terminal positive frame, the desired number of intermediate cell frames and a terminal negative frame.

Another object of our invention is to provide a multiple tier bipolar cell construction in which the exposed upper top of one intermediate frame unit forms the cathodic base plate for the next higher unit while the bottom portion of said intermediate frame unit forms an insulated lined top for the next lower unit in the tier, from which top the anodes are supported spaced from the top portion of the next lower frame unit.

Another object of our invention is to provide a multiple tier bipolar cell construction especially designed to operate with the units inclined from about 2° to about 85° below the horizontal, whereby greater operating efficiency is obtained.

Various other objects and advantages of our invention will become apparent as this description proceeds.

Referring to the drawings, which illustrate the preferred embodiments of our invention:

While the cell described herein may be operated in substantially horizontal position, i.e., sloping at an angle of less than 1° from the horizontal, we prefer to operate the cell described as an inclined plane mercury cathode cell in which the cathodic cell bases, over which the mercury cathode flows, are inclined between about 2° to about 85° from the horizontal, as we have found that better operating efficiencies may be secured in this way.

Figure 1:
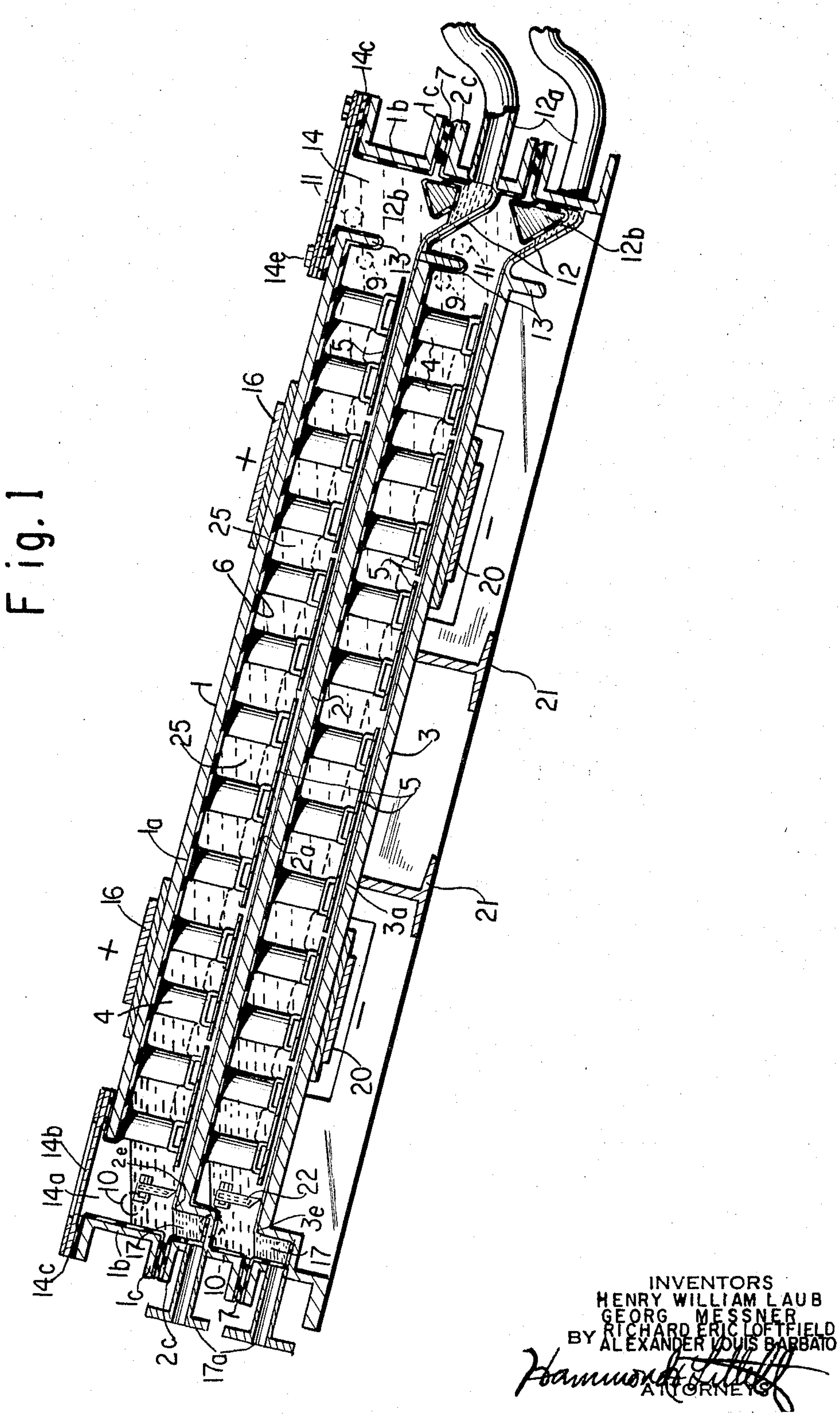
FIG. 1 is a longitudinal cross-sectional view of one form of our improved cell.

In the embodiment illustrated in FIG. 1, the cell comprises a terminal positive end frame 1, an intermediate frame 2 and a terminal negative frame 3. While only one intermediate frame 2 is shown, it will be understood that any number of intermediate frames 2 may be assembled between a positive and a negative end frame. The cell illustrated in FIG. 1 is shown as inclined about 15° from the horizontal. It may be operated in any inclination from about 2° to about 85° from the horizontal. Inclinations from about 5° to about 30° from the horizontal are preferred.

The positive end frame 1 (FIGS. 1, 2 and 3) comprises upper plate or top member 1*a* having a dependent rim or frame 1*b* extending downward around the edges thereof, on four sides, so as to form an inverted box-like structure. At its lower edges the frame 1*b* is provided with integral outwardly extending flanges 1*c* by which it is connected with similar flanges 2*c* on the intermediate frame 2.

Figure 2:
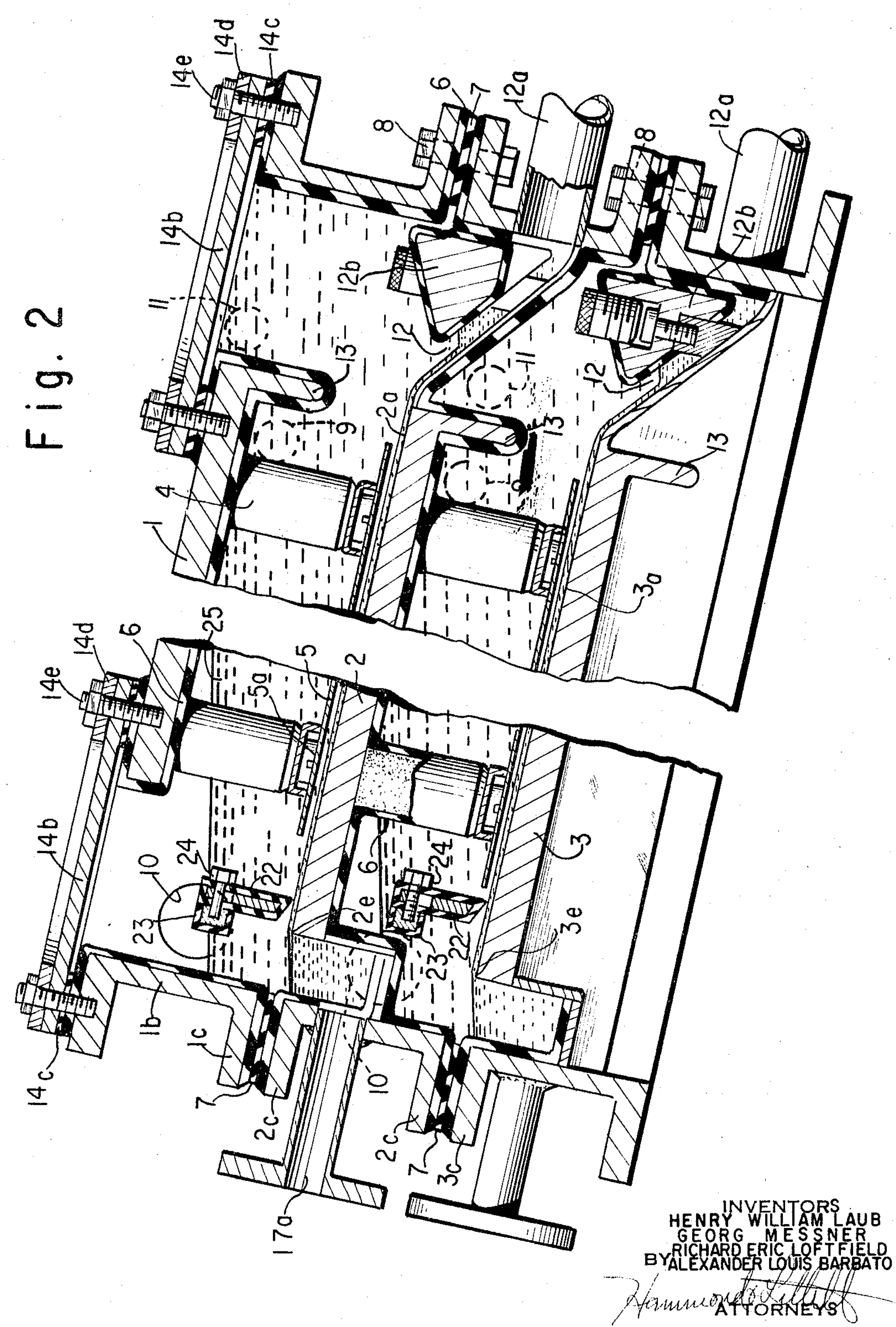
FIG. 2 is an enlarged detail view, similar to FIG. 1, showing the end construction of the mercury feeder unit and the amalgam outlet end of the cell.
Figure 3:
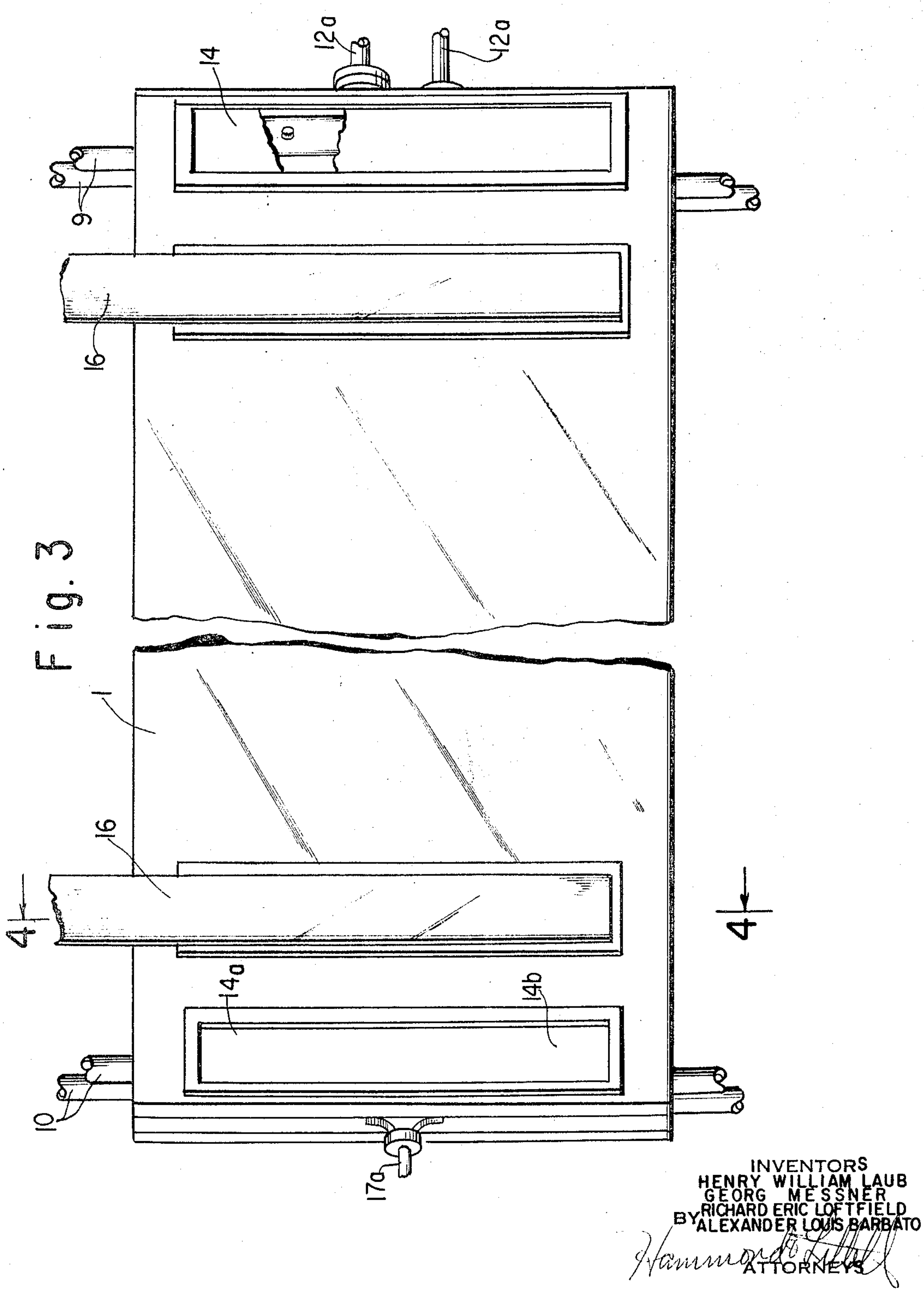
FIG. 3 is a plan view with parts broken away.
Figure 4:
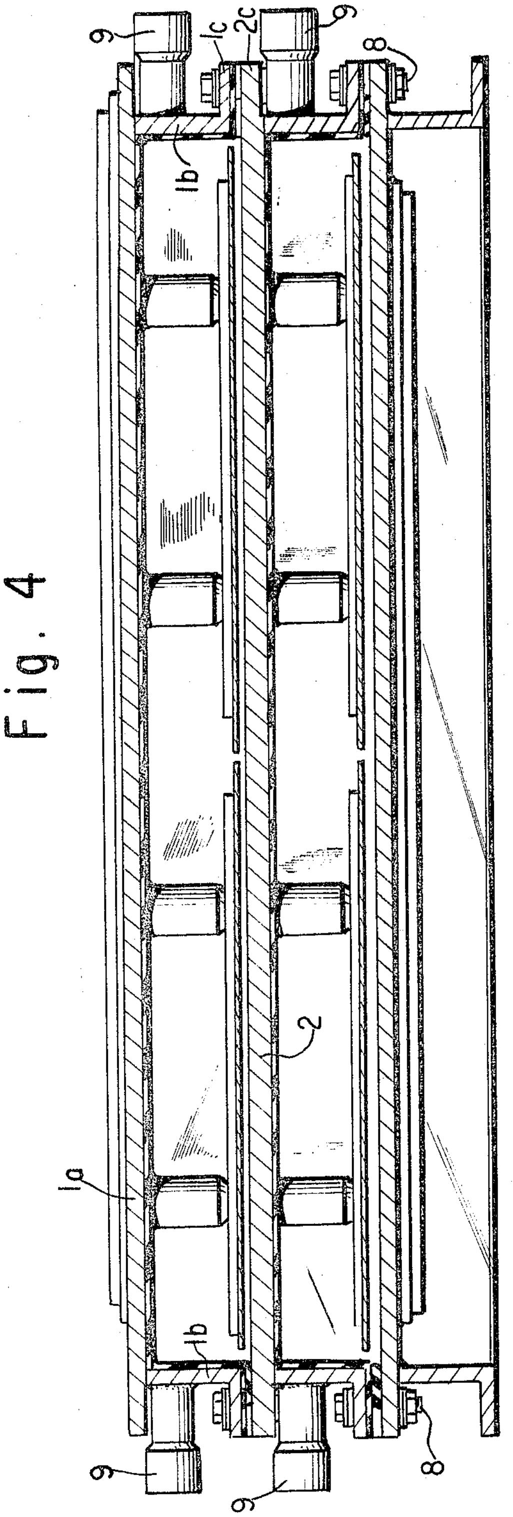
FIG. 4 is a transverse cross-sectional view of the cell illustrated in FIG. 3 approximately on the line 4—4.

From the underside of plate 1*a* a plurality of anode supports 4, preferably formed integral with the plate 1*a*, project downwardly and at the lower end of anode supports 4, anodes 5 are secured by screw connections 5*a* (FIG. 2). The underside of the plate 1*a*, flanges 1*b* and anode supports 4 are covered with insulating material 6 such as rubber, or the like, to protect these surfaces from corrosion and prevent current leakages from these surfaces. Instead of rubber-like electrical insulation, the underside of plate 1*a*, flanges 1*b*, anode supports 4 and other areas which need protection from the electrolyte and anodic conditions could be coated with titanium or similar valve metals which transmit current to the electrolyte only under cathodic conditions, or any other lining materials resistant to cell conditions may be used.

Figure 5:
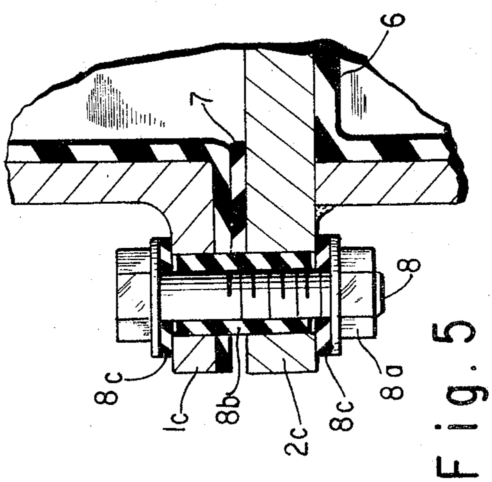
FIG. 5 is an enlarged cross-sectional view of the insulated bolting means for attaching the multiple tiers of cells together.

A spacer gasket 7 of insulating material is provided between the flanges 1*c* and 2*c* and the positive end frame member 1, the intermediate frame members 2 and the negative end frame member 3 are secured together by a plurality of bolts 8 (FIG. 5) which extend through holes in the flanges 1*c*, 2*c*, 3*c*, etc. and are provided with nuts 8*a* by which the flanges 1*c*, 2*c*, 3*c*, etc. are held in fluid-tight contact against the gaskets 7. Adjustment of the spacing between the anodes and the cathode may be made by using spacer gaskets 7 of different thickness.

To prevent current leakage between the frames 1, 2 and 3, an insulating ferrule 8*b* is placed around each bolt 8 and insulating washers 8*c* separate the head of bolt 8 and nut 8*a* from the flanges 1*c*, 2*c*, 3*c*, etc. (see FIG. 5).

The positive end frame 1 has concentrated brine inlets 9 through the sides thereof, preferably near the lower end of the inclined frame. However, the brine inlets may be located at either end or in the mid-portion of the cell. Combined outlets 10 for chlorine and depleted brine are located near the upper edge of the end frame 1 and intermediate frame 2 although separate chlorine and depleted brine outlets may be used if desired.

As a safety precaution, outlets 11 for any hydrogen released in the amalgam outlet or end boxes 12 may be provided in the lower end of positive end frame 1 and intermediate frames 2 and a separating partition plate 13 may be provided extending downwardly across the lower ends of frames 1 and 2 and terminating above the mercury level of the flowing mercury cathodes to separate any hydrogen which might be released in the mercury amalgam end boxes 12 from mixing with the chlorine released at the anodes 5. However, the partition plates 13 and outlets 11 are only useful during times of extreme operational upsets of the cell.

The positive end frame 1 is provided with rectangular openings 14 and 14*a* at each end thereof, closed by transparent cover plates 14*b*. Casket 14*c* and 14*d* are provided. The cover plates 14*b* are removably secured to the frame 1 by bolts 14*e*. The cover plates 14*b* may be omitted, however. By removing the covers 14*b*, access to each end of frame 1 may be had for better inspection. The cover plates 14*b* may be made of rubber, plastic or easily frangible material so that they will blow up or break in the event of an explosion inside the cell and thereby protect the cell from greater damage. Positive bus bar connections 16 are provided as needed along the top of end frame 1.

The intermediate frame members 2 are similar to end frame 1 in that the top plates 2*a* are provided with depending anode supports 4 for supporting the anodes 5 of the intermediate frames 2. However, the upper surfaces of the top plates 2*a* of intermediate frames 2 and the upper surface of top plate 3*a* of the negative end frame 3 act as the cathodic plates over which the mercury flows from end to end of the cell to provide the mercury cathodes for the cell tier. The intermediate frame members and anode supports are insulated in the same manner as the bottom side of top frame 1.

At the upper end of the intermediate frames 2 and of end frame 3 a substantially rectangular mercury inlet box 17 extends from side to side of plates 2*a* and 3*a* and is provided with a mercury inlet 17*a* by which mercury from a suitable source is continuously fed into the inlet boxes. The mercury overflows the upper edge 2*e* of the plate 2*a* and 3*e* of the plate 3*a* and flows down the upper surface of plates 2*a* and 3*a* to the amalgam outlet or end boxes 12.

The lower or terminal negative frame 3 resembles frame 2 in general. Plate 3*a* serves as the cathode base plate for an intermediate cell 2. Mercury inlet box 17 and inlet 17*a* are present at the upper end and mercury outlet box 12 is present at the lower end of the terminal negative frame 3. However, no inlets 9 for brine, outlets 11 for hydrogen or outlets 10 for depleted brine are required in the sides of terminal frame 3. In addition, the lower side of the negative terminal frame is not covered with an insulating material such as 6 used on the lower side of plate 2*a*. Terminal plate 3 further requires no depending anode supports but may have a cross member 13. This is solely for convenience in manufacture since the terminal plate 3 may be made substantially the same as plate 2.

A spacer gasket 7 of insulating material is likewise provided between the flanges 2*c* and 3*c* of frames 2 and 3 and these flanges are also bolted together by bolts 8 in the same manner described above between flanges 1*c* and 2*c* (see FIG. 5). The thickness of the spacer gaskets 7 controls the spacing of the anode faces from the cathode.

Along the lower side of plate 3*a*, a plurality of negative bus bars 20 are attached for providing the negative electrical terminal for the entire tier of bipolar cells.

Suitable structural supporting elements 21 are positioned below frame 3 for maintaining the cells at the proper desired angle.

Any suitable means may be used to secure uniform spread of mercury from the mercury feed boxes 17 over the cathodic plates 2*a* and 3*a*. One such uniform spreader means consists of an adjustable dam 22 mounted on bar 23 and adjustable toward and away from the base plates 2*a* and 3*a* by means of adjustment bolts 24. Dam 22, bars 23 and bolts 24 are covered with suitable insulation.

The amalgam flows out of each unit of the multiple tier cell through outlet boxes 12 having amalgam discharge outlets 12*a* from which the amalgam flows to a suitable denuder where, in the production of chlorine and caustic soda, the sodium is converted to sodium hydroxide and the mercury is recovered and returned to the mercury inlet boxes 17.

The end of cathode plates 2*a* and 3*a* are preferably sloped downward into the outlet boxes 12 as indicated and a pool of amalgam is retained in the outlet box of each cell by the gooseneck shape of outlets 12*a* or by suitable valve arrangements. Insulated fillers 12*b* in the outlet boxes 12 reduce the volume of mercury retained in each cell.

In operation, the cell compartments are kept substantially filled with electrolyte 25 to the level of the chlorine and depleted brine outlets 10 so that the space between the tops of anodes 5 and the bottom of the cell covers 1*a*, 2*a*, etc. and the electrolyte gap between the faces of anodes 5 and the flowing mercury cathode are kept filled by electrolyte which flows into each cell at the inlets 9 and out at 10.

In cells in which the base plates 2*a*, 3*a*, etc. slope between 2° and 30° from the horizontal, the increased slope in the outlet boxes 12 is preferably of the order of about 40°, but where the slope of the base plate is more than 30°, the downward inclination in the outlet boxes must be such that the total inclination from the horizontal is not more than 90°. Straight outlet boxes 12 having no increased slope from the slope of base plates 2*a* and 3*a* may also be used.

Figures 6, 7:
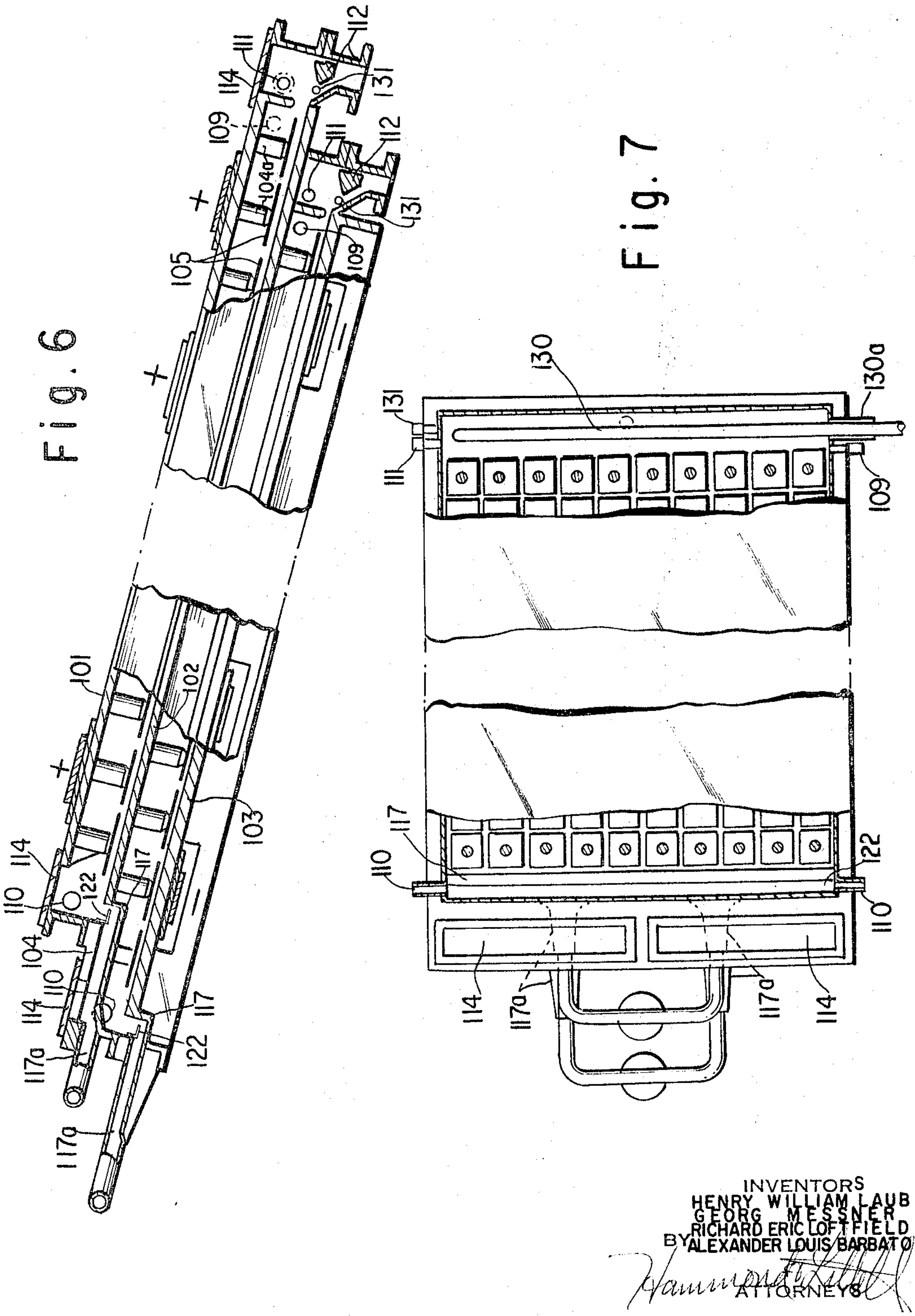
FIG. 6 is a longitudinal cross section of a modified form of cell arrangement and FIG. 7 is a part-sectional plan view of the form of embodiment of cell illustrated in FIG. 1.

FIGS. 6 and 7 illustrate a modified form of multiple tier cell arrangement in which the cells are essentially similar in construction and method of operation to the cells illustrated in FIGS. 1 to 5, but are stacked in an offset manner to provide a stair tread configuration so that a portion of each cell can be opened to observe the mercury flow or for partial inspection of the interior of the cell. Thus in FIGS. 6 and 7 the intermediate frame 102 is offset with reference to the terminal positive end frame 101, as indicated at 104. In a multiple tier cell each intermediate frame 102 is offset from the next higher intermediate frame in a similar manner. The terminal negative frame 103 is fitted to the intermediate frame 102 as illustrated in FIGS. 1 to 5. Mercury inlet boxes 117, fed by mecury inlets 117*a*, extend from side to side of frames 102 and 103. Gates 122 regulate the volume of mercury flow. Chlorine discharge outlets 110 discharge chlorine and depleted brine from the cells. The mercury inlets 117*a* are spaced so as not to interfere with the chlorine and spent brine discharge, as illustrated in FIG. 7. The amalgam outlets of end boxes 112 are similar to end boxes 12 of FIGS. 1 to 5 and brine inlets 109, hydrogen outlets 111, anode supports 104*a*, anodes 105, etc. (not shown) are similar to the corresponding parts of FIGS. 1 to 5.

Inspection windows 114 are provided at the upper edge of positive end frame 101 and in the offset projection 104 of intermediate frames 102. The windows 114 may be provided with transparent (glass) covers or with removable opaque covers. By looking through the transparent covers or by removing the opaque covers and looking through the open windows 114 when the current is off the cell, the mercury flow out of mercury inlet boxes 117 can be observed for each cell in the tier, and during periods when the cells are not in operation, portions of the cells may be examined through the windows 114.

To provide for inspection at the outlet end of the cells of FIGS. 6 and 7, a closed-end glass tube 130 is permanently fitted into each cell and sealed to the cell by a rubber or neoprene sleeve 130*a*. The ends of tubes 130 outside the cells are left open. For inspection of the outlet end of the cells a periscope with a 45° angle mirror and an electric light may be introduced into the glass tubes 130. This periscope does not need to be tightened to the cell tier and may be easily transferred from one tier to another. It may be moved from end to end of tube 130 and rotated about its axis to provide inspection for all portions of the outlet ends of the cells.

Hydrogen gas outlets 111 provide for discharge of hydrogen from the end boxes and drain outlets 131 permit drainage of the cells. Brine inlets are shown at 109.

Instead of stacking the cell tiers in an offset manner endwise of the cells, they may be stacked in an offset manner sidewise of the cells so as to expose the entire side of the cell tiers to inspection in a manner similar to that described in connection with FIGS. 6 and 7.

As illustrated in the drawings of FIGS. 1 to 7, a multiple tier bipolar cell of any desired number of cell units may be built up by merely repeating the number of intermediate frames 2 or 102. While this is theoretically true, there is a practical limit to the number of cells because of the limitations of handling equipment and other factors, also single cells of the type described may be formed by combining a terminal positive end frame 1 or 101 and a terminal negative frame 3 or 103.

While we have illustrated and described a preferred embodiment of our improved multiple tier cell construction, it will be understood that various modifications and changes may be made without departing from the spirit of our invention or the scope of the following claims.

We claim:

1. In a multiple tier bipolar electrolytic cell a plurality of cell units, each comprising a cell box having an exposed electrically conducting metal top and an insulation-lined box-like structure below said top forming the enclosure for the next lower cell in the tier, insulated anode support means electrically connected to and projecting downward from the top of said insulation-lined box-like structure, anodes supported from said insulated anode support means and electrically connected to and spaced from said electrically conducting metal top of said cell and from the exposed metal base of the next lower cell unit in said tier, means to introduce mercury into each of said cell units and cause it to flow over said electrically conducting metal tops, means to introduce a brine solution into each of said cell units and means to withdraw a depleted brine solution from each of said cell units, means to withdraw mercury amalgam separately from each of said cell units, means to impress electrolyzing current across each of said cell units and from said cell to cell and means to support a plurality of said cell units in electrical contact and at an inclination in the same direction of between about 2° and about 85° to the horizontal.

2. A multiple tier bipolar electrolytic cell according to claim 1 in which the cell units are offset with reference to each other and have inspection windows in the offset portion.

3. A multiple tier bipolar electrolytic cell according to claim 1 in which a closed end glass tube adapted to receive a viewing periscope extends into a cell unit.

4. An electrolytic cell according to claim 1 in which the intermediate cell units are offset with reference to the upper terminal unit and with reference to each other to produce a stair-tread configuration and in which mercury is separately fed to each cell unit and mercury amalgam separately discharged from each cell unit.

5. In a multiple tier bipolar electrolytic cell a terminal positive end frame, a terminal negative end frame and a plurality of intermediate cell frames, each said frame comprising a cell box having an exposed electrically conducting metal top forming a cathodic cell base for the next higher cell in the tier, four sides below said top forming the enclosure for the next lower cell in the tier, said cell box being insulation-lined, insulated anode support means projecting downward from the top of said insulation-lined box-like structure, anodes supported from said insulated anode support means and electrically connected to and spaced from said electrically conducting metal top of said cell through said supports, and spaced from the exposed metal base of the next lower cell unit in said tier, means to introduce mercury into each of said intermediate cell units and cause it to flow over said exposed metal cathodic cell bases, means to introduce a concentrated brine solution into each of the said intermediate cell units and means to withdraw a depleted brine solution from each of said cell units, said means being located so that said cell is maintained substantially filled with brine to the upper corner thereof, means to withdraw chlorine from each of said cell units, means to separately withdraw mercury amalgam from each of said cell units, means to impress electrolyzing current across each of said cells and from cell to cell and means to support a plurality of said cell units in electrical contact and at an inclination in the same direction of about 2° to about 85° to the horizontal.

6. In a multiple tier bipolar electrolytic cell a terminal positive end frame, a terminal negative end frame and a plurality of intermediate frames forming a plurality of cell units, each intermediate frame comprising a cell box having an electrically conducting metal top exposed on the upper surface thereof forming a cathodic cell base for the next higher cell in the tier, a box-like side and end wall structure below said top forming the enclosure for the next lower cell in the tier, each said frame forming an enclosure, being insulation-lined, insulated anode support means projecting downward from the top of said insulation-lined box-like structure, anodes supported from said insulated anode support means and electrically connected to and spaced from said electrically conducting metal top of said cell through said anode support means and spaced from the exposed metal base of the next lower cell unit in said tier, means to introduce mercury into each of said cell units and cause it to flow over said exposed metal cathodic cell bases, means to introduce a concentrated brine solution into each of said cell units and means to withdraw a depleted brine solution from each of said cell units, said brine withdrawal means being located in the upper corner of the cell units so as to maintain said cell units substantially filled with brine, means to withdraw chlorine from each of said cell units, means to separately withdraw mercury amalgam from each of said cell units, means to impress electrolyzing current across each of said cells and from cell to cell and means to support a plurality of said cell units in electrical contact and at an inclination in the same direction of about 2° to about 85° to the horizontal.

7. In an electrolytic cell of the type described, a top member having an inverted box-like structure open at the bottom and a base member on which said inverted box-like structure rests, and means to secure said members together, anode supports secured to and projecting downwardly from the top of said inverted box-like structure, anodes secured to said supports and spaced from said base member, insulation coating on the interior of said inverted box-like structure and anode supports, a mercury inlet box at one end of said base member, a mercury outlet box at the other end of said base member, means to introduce concentrated electrolyte into said cell, means to withdraw spent electrolyte and cell gases from said cell, said means being so located as to maintain each cell unit filled with said electrolyte, means to impress an electrolyzing current across said cell and means to support said cell inclined in the same direction between about 2 and about 85° from the horizontal.

8. In an electrolytic cell of the type described, a top member having an inverted box-like structure open at the bottom, an intermediate member having an inverted box-like structure open at the bottom, said top member resting on the top of said intermediate member, a base member on which the said inverted box-like structure of said intermediate member rests and means to secure said members together, anode supports secured to and projecting downwardly from the top of said inverted box-like structure of said top member and said intermediate member, anodes secured to said supports and spaced from the top of said intermediate member and from said base member, insulation lining on the interior of each said inverted box-like structure and said anode supports a mercury inlet box at one end of the top of said intermediate member, a mercury outlet box at the other end of the top of said intermediate member, a mercury inlet box at one end of said base member, a mercury outlet box at the other end of said base member, means to introduce concentrated electrolyte into the cell units formed by said top intermediate and base members, means to withdraw spent electrolyte and cell gases from the upper end of said cell units, wherein said cell units are maintained substantially filled with electrolyte means to impress an electrolyzing current across said cell units and means to support said cell inclined in the same direction between about 2° and about 85° from the horizontal.

9. An electrolytic cell according to claim 5 in which the intermediate member is offset with reference to the top member and is provided in the offset portion with means for inspecting the interior of the cell formed by the top member and the intermediate member.

10. An electrolytic cell according to claim 5 in which the intermediate member is offset with reference to the top member and is provided in the offset portion with means for inspecting the interior of the cell formed by the top member and the intermediate member, and a closed end glass tube adapted to receive a viewing periscope is provided in the opposite end of the cell unit.

11. A multiple unit bipolar electrolytic cell inclined from the horizontal and using a mercury cathode for electrolyzing electrolyte solutions and having an upper terminal unit, at least one intermediate unit, and a lower terminal unit, said units comprising an inverted box-like structure open at the bottom, resting one upon the other and forming a plurality of box-like cell chambers, a separate mercury inlet and a separate mercury outlet in each cell chamber, and a conducting base formed by the upper surface of each said unit over which the mercury flows from the inlet to the outlet of each cell chamber, anodes suspended within each cell chamber and spaced from said conducting bases, insulation lining in each said cell chamber means to introduce concentrated electrolyte into each cell chamber, means to remove spent electrolyte and cell gases from each cell chamber, means to maintain each said cell chamber substantially filled with electrolyte to the upper corner thereof, and means to impress an electrolyzing current across all of said cell chambers.

12. An electrolytic cell according to claim 6 in which the intermediate units are offset with reference to the upper terminal unit and with reference to each other to produce a stair tread configuration and in which the offset portions are provided with means for access to the interior of the cell chambers for inspection thereof.

13. As an article of manufacture, a bipolar electrode having an upper flat conductive plate forming a conducting surface over which mercury can flow, a mercury feed box disposed laterally along one end of said flat plate for feeding mercury thereto, a downward inclined amalgam discharge box disposed laterally along the other end of said flat plate for discharging amalgam therefrom, a depending frame projecting downward around the four edges of said flat plate and acting as a support for said plate, anode supports electrically connected to and projecting downward from said flat plate within said frame, and anodes mounted on said anode supports.

14. As an article of manufacture, a bipolar electrode having an upper flat conductive plate forming a conducting surface over which mercury can flow, a mercury feed box disposed laterally along one end of said flat plate for feeding mercury thereto, a downwardly inclined amalgam discharge box disposed laterally along the other end of said flat plate, an insulated filler in said discharge box, a depending frame projecting downward around the four edges of said flat plate and acting as a support for said plate, anode supports electrically connected to and projecting downward from said flat plate within said frame, anodes mounted on said anode supports, the under side of said plate, the interior of said frame and said anode supports being insulated.

References Cited by the Examiner

UNITED STATES PATENTS

| | | | |
|---|---|---|---|
| 2,576,553 | 11/1951 | Andreasen | 204—219 |
| 2,627,501 | 2/1953 | Gardiner | 204—225 |
| 2,648,630 | 8/1953 | Basilewsky | 204—219 |
| 2,688,594 | 9/1954 | Oosterman | 204—219 |
| 2,719,117 | 9/1955 | Blue et al. | 204—220 |

FOREIGN PATENTS

| | | |
|---|---|---|
| 1,783 | of 1901 | Great Britain. |

JOHN H. MACK, *Primary Examiner.*

A. B. CURTIS, D. R. JORDAN, *Assistant Examiners.*